(12) United States Patent
Körner

(10) Patent No.: US 7,049,884 B2
(45) Date of Patent: May 23, 2006

(54) DEMODULATION ARRANGEMENT FOR A RADIO SIGNAL

(75) Inventor: Heiko Körner, Söding (AT)

(73) Assignee: Infineon Technologies AG, Munich (DE)

( * ) Notice: Subject to any disclaimer, the term of this patent is extended or adjusted under 35 U.S.C. 154(b) by 96 days.

(21) Appl. No.: 10/901,666

(22) Filed: Jul. 29, 2004

(65) Prior Publication Data

US 2005/0052227 A1    Mar. 10, 2005

(30) Foreign Application Priority Data

Aug. 1, 2003   (DE) ............................... 103 35 044

(51) Int. Cl.
    *H03D 3/00*    (2006.01)
    *H04L 27/14*   (2006.01)
(52) U.S. Cl. .................. 329/302; 329/300; 375/334
(58) Field of Classification Search ........ 329/300–303, 329/304, 306; 375/324, 334–337
See application file for complete search history.

(56) References Cited

U.S. PATENT DOCUMENTS

| | | | |
|---|---|---|---|
| 5,436,931 A | * | 7/1995 | Minami ...................... 375/334 |
| 5,781,588 A | * | 7/1998 | Abe et al. .................... 375/334 |
| 5,949,280 A | * | 9/1999 | Sasaki ........................ 329/303 |
| 6,356,749 B1 | * | 3/2002 | Rollins et al. ............... 455/334 |
| 6,738,433 B1 | * | 5/2004 | Van Waasen et al. ........ 375/316 |

FOREIGN PATENT DOCUMENTS

| | | |
|---|---|---|
| EP | 0 723 335 B1 | 7/1996 |
| GB | 2 137 836 A | 10/1984 |

* cited by examiner

*Primary Examiner*—David Mis
(74) *Attorney, Agent, or Firm*—Eschweiler & Associates, LLC

(57) ABSTRACT

A demodulation arrangement for a radio signal is disclosed wherein an I/Q mixer converts the radio signal to a real and an imaginary component and supplies the components to a limiting circuit. The limiting circuit limits the amplitude of the signals applied to its inputs. A demodulator circuit receives the output of the limiting circuit and converts the signal components to a demodulated signal including a sequence of pulses. A pulse shaper circuit converts the pulses having pulse amplitudes that are greater than a first threshold value to output pulses having a predetermined first amplitude. This reduces fluctuations in the pulse amplitudes, thus leading to a reduction in low-frequency interference and jitter in the data signal.

19 Claims, 2 Drawing Sheets

DEMODULATION ARRANGEMENT FOR A RADIO SIGNAL

REFERENCE TO RELATED APPLICATIONS

This application claims the benefit of the priority date of German application DE 103 35 044.6, filed on Aug. 1, 2003, the contents of which are herein incorporated by reference in their entirety.

FIELD OF THE INVENTION

The invention relates to a demodulation arrangement for a radio signal.

BACKGROUND OF THE INVENTION

In receiver systems for radio signals containing digital components, an I/Q mixer is used to break the received signals down into their complex components, convert them to an intermediate frequency and then supply them to a demodulator unit for conversion to a demodulated signal. The demodulated signal is processed further in various circuits and is finally supplied to a circuit which converts it to a binary logic state.

In one design of an FSK receiver, the demodulator unit is in the form of a quadricorrelator. Said demodulator unit uses the complex I and Q signals applied to its inputs as a basis for producing a sequence of pulses having pulse amplitudes which are positive or negative with respect to a reference. A plurality of these pulses are averaged in an analog or digital filter, and the averaged signal is supplied to an evaluation unit.

Various circuit blocks are involved in forming the pulses within the quadricorrelator. The individual circuit blocks are not ideally matched to one another on account of component variations and mismatch. This results, at the output of the quadricorrelator, in pulses which do not have a uniform shape and, for example, have amplitudes of differing magnitude or have different zero points. Since the mismatch between the individual circuit blocks within the quadricorrelator is constant, the non-uniform shape of the pulses as well as the amplitude modulation of the pulses are repeated at regular intervals. This results in discrete components at low frequencies in the spectrum, which may interfere with the wanted signal. This interference becomes apparent from increased jitter in the demodulated signal and gives rise to errors during subsequent signal processing.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The invention is directed to a demodulation arrangement that causes little interference with the demodulated output signal.

A demodulation arrangement for a radio signal comprises an I/Q mixer having an input and having an intermediate frequency output with two taps. The mixer is configured to convert a signal at a first frequency (which is applied to its input) to a real and an imaginary component at a second frequency. One tap of the intermediate frequency output is designed to provide the real component and the other tap is designed to provide the imaginary component. The demodulation arrangement furthermore comprises a limiting circuit having two input connections that are connected to the taps of the intermediate frequency output. The limiting circuit is designed to limit the amplitude of signals applied to its inputs and to tap off amplitude-limited signals from its output. The demodulation arrangement also comprises a demodulator circuit having an output and two inputs which are connected to the outputs of the limiting circuit, with the demodulator circuit being designed to convert signals that are applied to its inputs to a demodulated signal. The demodulated signal can be tapped off as a sequence of pulses at the output of the demodulator circuit.

According to the invention, the demodulation arrangement comprises a pulse shaper circuit having an output and an input that is coupled to the output of the demodulator circuit. The pulse shaper circuit is configured to convert input pulses having pulse amplitudes that are greater than a first threshold value to output pulses having a predetermined first amplitude.

This arrangement is used to easily produce a demodulated signal in the form of a sequence of pulses that always have the same amplitude. This reduces amplitude modulation of the pulses and thus interfering discrete frequency components in the spectrum of the output signal.

The demodulator circuit in the demodulation arrangement may comprise a quadricorrelator. The circuit elements within the quadricorrelator result in the production of pulses that, owing to the mismatch, have different amplitudes and thus lead to interference. Providing a pulse shaper circuit at the quadricorrelator's output results in the demodulation arrangement being designed to emit a demodulated signal in the form of a sequence of pulses having the same amplitude.

One expedient development is to configure the pulse shaper circuit to convert input pulses having a pulse amplitude that is smaller than a second threshold value to output pulses having a predetermined second amplitude. This makes it possible, if the demodulator circuit connected upstream of the pulse shaper circuit produces pulses of an orientation that are different than a reference, to convert the pulses having varying orientation and different amplitudes to pulses having varying orientation and the same amplitude.

In one development of the invention, the input of the pulse shaper circuit is coupled to a current source and a resistor, with the resistor's other connection being connected to a reference potential. This results in the input of the pulse shaper circuit being connected to a DC voltage operating point. Pulses applied to the input of the pulse shaper circuit thus produce voltage signals that are above or below the DC voltage operating point.

In one refinement of the arrangement, the pulse shaper circuit comprises a first differential amplifier and a second differential amplifier, each having a first input and a second input. The first input of the first differential amplifier and the second input of the second differential amplifier are coupled to the input of the pulse shaper circuit, and the respective other inputs of the differential amplifiers are each connected to a reference signal source. In this case, the amplitude of the respective reference signal source forms the first or second threshold value. In this context, in one development, each reference source is formed by a current source and a resistor which is connected to the current source, with the resistor's other connection being coupled to a reference potential. The reference potential is preferably ground. A connection for the input of the differential amplifier is provided between the resistor and the current mirror. The threshold value produced in this manner is a DC voltage.

In another refinement, the outputs of the two differential amplifiers are coupled to one another as well as to a current source and a resistor. The other side of the resistor is connected to a reference potential, and the coupling between the outputs of the differential amplifiers, the current source and the resistor forms the output of the pulse shaper circuit.

BRIEF DESCRIPTION OF THE DRAWINGS

Further refinements of the invention emerge from the subclaims. The invention is explained in detail below using the drawings, in which:

DETAILED DESCRIPTION OF THE INVENTION

Figure 1:
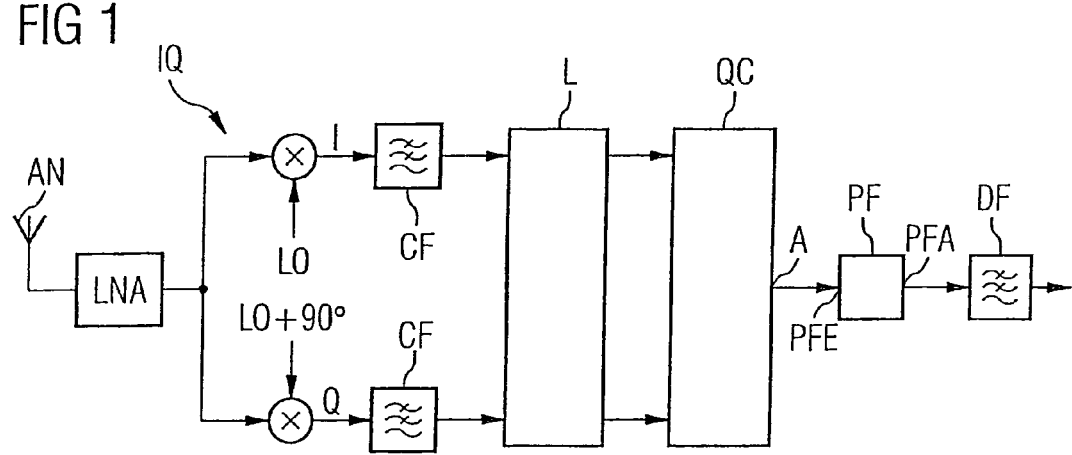
FIG. 1 is a block diagram illustrating a demodulation arrangement according to one aspect of the invention.

FIG. 1 shows a demodulation arrangement for a radio signal. An antenna AN is coupled to an amplifier LNA which itself is connected to the inputs of an I/Q mixer IQ. The I/Q mixer IQ has two mixers which each have a signal input, a signal output as well as a local oscillator input. A local oscillator signal LO is applied to the local oscillator input of one mixer. A local oscillator signal LO which has been phase-shifted through 90 degrees with respect to the local oscillator signal of the first mixer is applied to the local oscillator input of the other mixer. Both mixers convert an input signal to an output signal at an intermediate frequency. The I/Q mixer breaks the input signal down into its complex components and outputs them as signals at an intermediate frequency. The intermediate frequency outputs of the I/Q mixer are connected to a channel filter CF which is in the form of a low-pass filter. The outputs of the channel filters CF are connected to the connections of a limiting circuit L.

The outputs of the limiting circuit L lead to the signal inputs of the demodulator circuit QC. The output A is coupled to the input PFE of a pulse shaper circuit PF. The output PFA of the pulse shaper circuit PF is connected to a digital filter DF from whose output a signal may be tapped off for further signal processing.

A signal which has been received at the antenna and has been amplified by the amplification device LNA is broken down into its complex components in the I/Q mixer and converted to an intermediate frequency. The real component of the converted input signal can be tapped off from the intermediate frequency output I of the I/Q mixer IQ, and the imaginary component can be tapped off from the intermediate frequency output Q. The two signals are tapped off from the outputs of the I/Q demodulator and filtered by the channel filters CF, thus suppressing higher frequency components that result from the mixing operation. The amplitude of signals applied to the inputs of the limiting circuit L is limited in the latter, so that downstream circuits are not overdriven. The limiting circuit allows signals having an amplitude which is smaller than a limit value to pass through unchanged and limits only signals having a greater amplitude to the limit value. The signals I and Q that have been amplitude-limited in this manner are the input signals for the quadricorrelator QC, which demodulates them and emits them as a sequence of pulses at the output.

The demodulated output signal (in the form of a sequence of pulses) from the quadricorrelator QC is supplied to the pulse shaper circuit PF. The latter uses the input pulses to form pulses having the same amplitude and outputs them at the output PFA. The output signal is filtered again in a filter DF and processed further.

Figure 2:
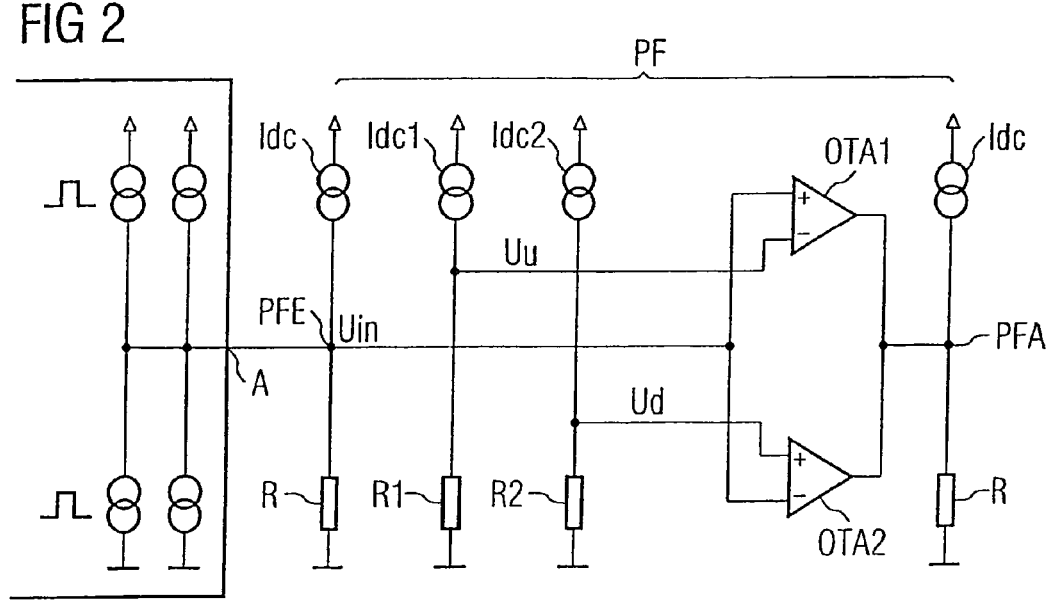
FIG. 2 is a schematic diagram illustrating a pulse according to another aspect of the invention.

FIG. 2 shows a detail of one exemplary refinement of the pulse shaper circuit PF. The input PFE, which is connected to the output A of the quadricorrelator QC, is furthermore coupled to a current source Idc as well as a resistor R. The other side of the resistor R is connected to a reference potential. The input PFE is connected to two differential amplifiers OTA1 and OTA2 that are configured as transconductance amplifiers. The two transconductance amplifiers each have a first input "+" and a second input "−". The input PFE of the pulse shaper circuit PF is connected to the first input "+" of the transconductance amplifier OTA1 and to the second input "−" of the transconductance amplifier OTA2.

The second input "−" of the first transconductance amplifier OTA1 is coupled to a current source Idc1 as well as to a resistor R1 whose other connection is connected to a reference potential. The first input "+" of the second amplifier OTA2 is itself coupled to a current source Idc2 and a resistor R2. The two outputs of the transconductance amplifiers OTA1 and OTA2 are connected to one another as well as to the current source Idc and to a further resistor R, and form the output PFA of the pulse shaper circuit PF. The other side of said resistor R is coupled to the reference potential.

The resistors R, R1 and R2 are selected in such a manner that the value of the resistor R1 is a quarter higher than the value of the resistor R, and the value of the resistor R2 is a quarter lower than the value of the resistor R.

Figure 3A:
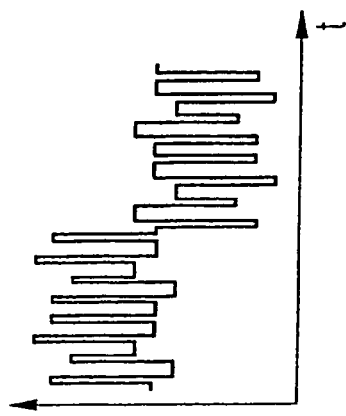
FIGS. 3A–3C are graphs illustrating the time profile of pulses at various taps in the pulse shaper circuit of FIG. 2.

The current pulses which the quadricorrelator QC emits at its output A in FIG. 2 can be seen in FIG. 3A. The mismatch in the various circuit blocks in the quadricorrelator results in the current pulses emitted at the output A having different amplitudes and the zero point of the signal also fluctuating with time.

Figure 3B:
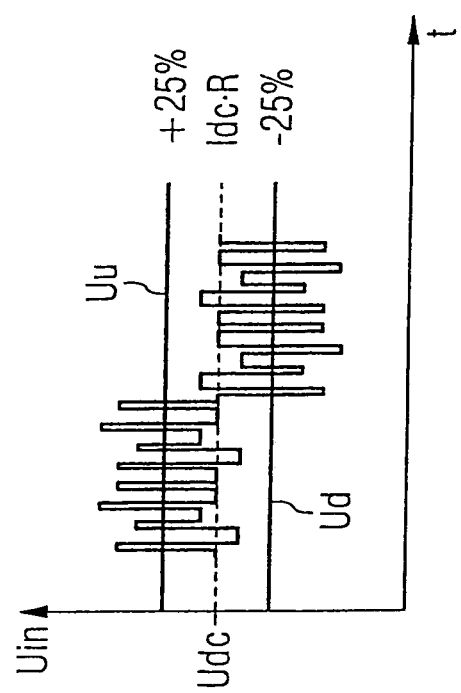

The current source Idc and the resistor R produce a DC voltage Udc which represents an operating point and is also applied to the inputs of the transconductance amplifiers when the quadricorrelator is not emitting a current pulse. Current pulses produced by the quadricorrelator QC are converted to voltage pulses $U_{IN}$, at the input PFE of the quadricorrelator, by the resistor R and the current source Idc and are supplied to the first input "+" of the first amplifier OTA1 and to the second input "−" of the second amplifier OTA2. The time profile of the voltage pulses $U_{IN}$ with respect to the voltage reference Udc can be seen in FIG. 3B.

The amplifiers OTA1 and OTA2 compare the applied voltage pulses $U_{IN}$ with a respective fixed DC voltage. The first voltage Uu is generated by the current source Idc1 and the resistor R1 and is supplied to the second input "−" of the first transconductance amplifier OTA1. The second voltage Ud, which is applied to the first input of the second amplifier OTA2, is governed by the current source Idc2 and the resistor R2. In the present exemplary embodiment, all of the current sources Idc, Idc1 and Idc2 provide the same current level. The relationship between the fixed DC voltages Uu and Ud and the DC operating point Udc (which is determined by the current source Idc and the resistor R) is thus dependent only on the ratios of R, R1 and R2.

In this exemplary embodiment, the value of the resistor R1 is 25% higher than the value of the resistor R. This produces a DC voltage Uu which is 25% higher than the voltage Udc which forms the DC operating point and results from the current from the current source Idc and the resistance R. The value of the resistor R2 is selected in such a manner that the voltage Ud resulting therefrom is 25% lower than the voltage Udc.

A resistor R and the current source Idc are used at the output to produce a DC voltage and thus an operating point at the output. The outputs of the amplifiers OTA1 and OTA2 generate current pulses that are converted to voltage pulses across the resistor R and can be tapped off from the output PFA.

When pulses whose-amplitudes are above the first voltage Uu are applied to the input of the first amplifier OTA1, the latter produces current pulses each having the same amplitude and the same zero point. Pulses having an amplitude below the DC operating point Udc are suppressed by the first transconductance amplifier OTA1. Negative pulses whose amplitude is below the second potential Ud are converted to pulses of negative amplitude by the second amplifier OTA2. The two amplifiers are set in such a manner that the voltage change is of the same magnitude for the two pulses. The pulses therefore have the same amplitude.

Figure 3C:
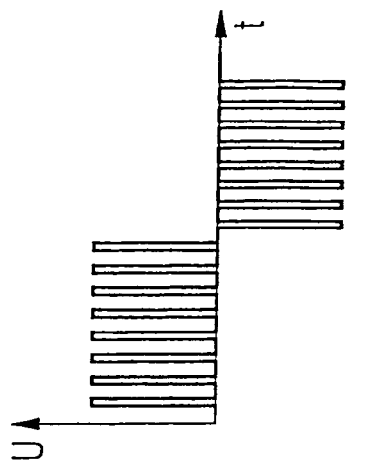

The current pulses at the output of the amplifiers are converted to voltage pulses by the resistor R. The zero point is the same for pulses having a positive amplitude and those having a negative amplitude and results from the DC voltage at the output PFA. A sequence of pulses each of the same magnitude and having the same zero point thus results at the output PFA of the pulse shaper circuit PF. A sequence of pulses such as this is shown in FIG. 3C. The uniform shape of the pulses reduces interfering frequency components and jitter in the data signal. The magnitude of the output amplitude may in this case be set directly by means of the output signal from the transconductance amplifiers.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

LIST OF REFERENCE SYMBOLS

| List of reference symbols | |
|---|---|
| AN: | Antenna |
| LNA: | Amplifier |
| IQ: | I/Q mixer |
| I, Q: | Intermediate frequency outputs |
| LO: | Local oscillator input |
| CF: | Channel filter |
| L: | Limiting circuit |
| QC: | Quadricorrelator |
| A, PFA: | Output |
| PFE: | Input |
| PF: | Pulse shaper circuit |
| DF: | Filter |
| Idc, Idc1, Idc2: | Current sources |
| R, R1, R2: | Resistors |
| Udc: | DC operating point, voltage |
| Uu, Ud: | DC voltages |
| "+", −: | Inputs |
| OTA1, OTA2: | Transconductance amplifier |
| t: | Time |

The invention claimed is:

1. A demodulation arrangement for a radio signal, comprising:
an I/Q mixer comprising an input and an intermediate frequency output comprising at least two taps, wherein the mixer is configured to convert an input signal at a first frequency to a real signal component and an imaginary signal component at a second frequency, wherein one of the at least two taps is configured to provide the real signal component and another of the at least two taps is configured to provide the imaginary signal component;
a limiting circuit comprising at least two input connections and at least two outputs, wherein one of the at least two input connections is connected to one of the at least two taps of the intermediate frequency output, and is configured to limit an amplitude of signals applied to its inputs, and wherein the amplitude-limited signals are tapped off at the at least two outputs;
a demodulator circuit comprising at least two inputs, wherein one input is connected to one of the at least two outputs of the limiting circuit, and comprising an output, wherein the demodulator circuit is configured to convert signals that are applied to the at least two inputs thereof to a demodulated signal, wherein the demodulated signal is tapped off as a sequence of pulses at the output thereof; and
a pulse shaper circuit comprising an input coupled to the output of the demodulator circuit, and comprising an output, wherein the pulse shaper circuit is configured to convert pulses of the sequence of pulses having pulse amplitudes that are greater than a first threshold value to output pulses having a predetermined first amplitude.

2. The demodulation arrangement of claim 1, wherein the demodulator circuit comprises a quadricorrelator.

3. The demodulation arrangement of claim 1, wherein the pulse shaper circuit is further configured to convert pulses from the sequence of pulses having pulse amplitudes that are smaller than a second threshold value to output pulses having a predetermined second amplitude.

4. The demodulation arrangement of claim 1, wherein an input portion of the pulse shaper circuit comprises a current source coupled to a first terminal of a resistor, a second terminal of which is coupled to a reference potential.

5. The demodulation arrangement of claim 1, wherein the pulse shaper circuit further comprises a first differential amplifier and a second differential amplifier, each having a first input and a second input, wherein the first input of the first differential amplifier and the second input of the second differential amplifier are coupled to the input of the pulse shaper circuit, and wherein the respective other inputs of the first and second differential amplifiers are coupled to a reference signal source, respectively.

6. The demodulation arrangement of claim 5, wherein the differential amplifiers comprise transconductance amplifiers.

7. The demodulation arrangement of claim 5, wherein each reference signal source associated with the first and second differential amplifiers comprise a current source and a resistor having a first terminal coupled to the current source, and a second terminal coupled to a reference potential, wherein the respective other input of the differential amplifiers is connected to the resistor and the current source of the respective reference signal source.

8. The demodulation arrangement of claim 5, wherein the outputs of the first and second differential amplifiers are coupled to one another, to a current source and to a first terminal of a resistor, a second terminal of which is coupled to a reference potential, with the coupling forming an output of the pulse shaper circuit.

9. A demodulation arrangement, comprising:
   mixing means operable to convert an input signal at a first frequency into real and complex signal components, and output the real and complex signal components at a second, intermediate frequency;
   demodulating means operable to receive the real and complex signal components at inputs and convert the signal components to a sequence of pulses at an output thereof; and
   pulse shaping means operable to convert the sequence of pulses having a magnitude greater than a threshold value to output pulses having a predetermined amplitude.

10. The demodulation arrangement of claim 9, further comprising limiting means operable to receive the real and complex signal components at inputs, and provide limited-amplitude signal components at an output thereof for provision to the demodulation means.

11. The demodulation arrangement of claim 9, wherein the pulse shaping means comprises comparison means operable to compare a magnitude of each of the sequence of pulses to a threshold and convert any of the pulses having a magnitude greater than the threshold to a pulse having the predetermined magnitude.

12. The demodulation arrangement of claim 9, wherein the pulse shaping means comprises an upper comparison means and a lower comparison means, wherein the upper comparison means is operable to compare each of the sequence of pulses to an upper threshold greater than a predetermined value and output pulses having the predetermined amplitude added to a reference value, and wherein the lower comparison means is operable to compare each of the sequence of pulses to a lower threshold less than the predetermined value and output pulses having the predetermined amplitude subtracted from the reference value.

13. A demodulation circuit, comprising:
   a mixer circuit configured to receive a radio signal at a first frequency and convert the radio signal into a real signal component and a complex signal component at a second, intermediate frequency;
   a demodulator circuit operably coupled to the mixer circuit, and configured to convert the real and complex signal components to a demodulated signal comprising a sequence of pulses; and
   a pulse shaper circuit operably coupled to the demodulator circuit, and configured to convert selected pulses of the sequence of pulses having a pulse amplitude exceeding a first threshold to a predetermined first amplitude, and further configured to convert selected pulses of the sequence of pulses having a pulse amplitude less than a second threshold to a predetermined second amplitude.

14. The demodulation arrangement of claim 13, wherein the first threshold is greater than the second threshold.

15. The demodulation arrangement of claim 13, further comprising a limiting circuit operably coupled between the mixer circuit and the demodulator circuit, and configured to receive the real and complex signal components from the mixer circuit, limit an amplitude of the real and complex signal components, and output amplitude-limited real and complex signal components to the demodulator circuit.

16. The demodulation arrangement of claim 13, wherein the pulse shaper circuit comprises:
   a first threshold reference generation circuit configured to generate the first threshold; and
   a first comparator circuit having a first input coupled to the output of the demodulation circuit and a second input coupled to an output of the first reference generation circuit, and configured to generate a pulse having the predetermined first amplitude when one of the sequence of pulses has a pulse amplitude greater than the first threshold.

17. The demodulation arrangement of claim 16, wherein the first comparator circuit comprises a differential transconductance amplifier having a positive input terminal coupled to the output of the demodulator circuit and a negative input terminal coupled to an output of the first threshold reference generation circuit.

18. The demodulation arrangement of claim 13, wherein the pulse shaper circuit comprises:
   a second threshold reference generation circuit configured to generate the second threshold; and
   a second comparator circuit having a first input coupled to the output of the demodulation circuit and a second input coupled to an output of the second reference generation circuit, and configured to generate a pulse having the predetermined second amplitude when one of the sequence of pulses has a pulse amplitude less than the second threshold.

19. The demodulation arrangement of claim 18, wherein the second comparator circuit comprises a differential transconductance amplifier having a negative input terminal coupled to the output of the demodulator circuit and a positive input terminal coupled to an output of the second threshold reference generation circuit.

* * * * *